3,506,718
AROMATIC FLUOROALKYL SULFIDES

Edward L. Mutsch, Woodbury Township, Washington County, Minn., assignor to Minnesota Mining and Manufacturing Company, St. Paul, Minn., a corporation of Delaware
No Drawing. Filed Apr. 8, 1968, Ser. No. 719,747
Int. Cl. C07c *149/34*
U.S. Cl. 260—609          8 Claims

---

ABSTRACT OF THE DISCLOSURE

Fluorine-containing sulfide compounds possessing fungicidal activity, particularly toward *Sclerotium rolfsii*. The compounds are represented by the structural formula:

Ar—alk—S—CH$_2$—(CF$_2$)$_m$—X wherein Ar is phenyl, substituted phenyl, naphthyl or substituted naphthyl, the substituents being lower alkyl, lower alkoxy, halo or nitro; —alk— is an alkyl group, being straight or branched chain, or cyclic and containing from 1 to 6 carbon atoms; m is an integer of from 1 to 8, preferably 2, 3, or 4 and X is hydrogen or fluorine.

---

BACKGROUND OF THE INVENTION

The present invention relates to novel fluorine-containing sulfide compounds, specifically to those represented by the structural formula:

Ar—alk—S—CH$_2$—(CF$_2$)$_m$—X wherein Ar is phenyl, substituted phenyl, naphthyl or substituted naphthyl, the substituents being lower alkyl, lower alkoxy, halo or nitro; —alk— is an alkyl group, being straight or branched chain or cyclic and containing from 1 to 6 carbon atoms; m is an integer of from 1 to 8, preferably 2, 3, or 4 and X is hydrogen or fluorine. These novel compounds are crystalline solids or viscous liquids which are somewhat soluble in many organic solvents. They have been found to possess fungicidal activity, and are particularly adapted to be employed as active toxic constituents of compositions for the control of the fungus, *Sclerotium rolfsii*.

PRIOR ART

Fungicidal sulfides, e.g., bis(3-halo-2-chloroprophenyl) sulfide are known (U.S. Patent 2,908,717), as are fluoroalkyl sulfides having no stated biological activity, e.g., as in U.S. Patents 3,006,964, 3,048,569 and 3,326,867. None of these, however, includes or suggests the incorporation of aryl or substituted aryl groups in conjunction with two methylene-fluoro-alkyl groups in the manner described herein. So far as is known, only the compounds of the invention appear to exhibit acceptable and effective fungicial activity toward *Sclerotium rolfsii*.

SUMMARY OF THE INVENTION

The present invention, therefore, contemplates compounds which are effective in controlling fungal pathogens often found in such plants as, for example, peanuts, carrots, cotton, tomatoes, beans and the like, particularly when the fungus is *Sclerotium rolfsii*.

The invention has in view a method for treating plants and seeds so as to effectively control fungal pathogens therein, by treating the plants with fungicidal compositions which include compounds of the invention.

The compounds of the invention are conveniently prepared by reacting compounds of the structural formula:

Ar—alk—A with compounds of the structural formula:

B—CH$_2$(CF$_2$)$_m$X wherein A is —SM and B is a reactive halogen or a reactive ester of the alcohol HOCH$_2$(CF$_2$)$_m$X, or wherein A is a reactive halogen or a reactive ester of the alcohol Ar—alk—OH and B is —SM and wherein M is hydrogen or metal atom, e.g. Na+, Ca++, Cu++,Cu+ or K+; Ar, alk, m and X have the meanings described above.

The reaction is carried out in compatible solvents, preferably lower aliphatic alcohols; however inert organic solvents such as benzene, toluene, xylene or dioxane as well as dimethyl formamide and pyridine are also acceptable. The reaction temperature can be varied within a range of the order of 0° C. to 110° C. and is preferably between about 25° C. and 90° C.

Examples of the reactive esters referred to above are esters of inorganic and organic acids, e.g., aromatic, alkyl and haloalkyl sulfonic acids.

When M is hydrogen, it is preferable to carry out the reaction in the presence of an acid acceptor, e.g. a tertiary amine, Na$_2$CO$_3$, NaOH or KOH.

The compounds of the invention can be dispersed in the usual fungicidal formulations, e.g., emulsifiable concentrates, spray powders, pastes, soluble powders, suspensions, dusts and granulates. Such formulations are prepared in known manner, for example, by extending the active ingredients with solvents and/or carriers, if desired with the use of emulsifiers and/or dispersing agents. Suitable auxiliaries for this purpose are mainly solvents, such as aromatics (e.g., xylene, benzene), chlorinated aromatics (e.g., chlorobenzenes), paraffins (e.g. petroleum fractions), alcohols (e.g. methanol, butanol), amines (e.g., ethanolamine, dimethyl formamide), and water; carriers such as natural rock flours (e.g. kaoline, aluminas, talc, chalk) and ground synthetic stone (e.g., highly dispersed silicic acid, silicates); emulsifiers, such as non-ionic and anionic emulsifiers (e.g., polyoxyethylene fatty acid esters, polyoxyethylene-fatty alcohol ethers, alkylsulfonates and arylsulfonates), and dispersing agents such as lignin, sulfite waste liquors, and methyl cellulose.

The formulations generally contain between 0.1 and 95 percent and preferably between 1 and 90% by weight of active compound and the compounds of the invention can be present in admixture with other known active ingredients.

Compositions containing compounds of the invention can be sprayed on or mixed into the soil, or applied as a foliage spray. Soil applications are applied at or before planting, as a side dressing to living plants, in the row, or as a soil drench. The dosage should be of the order of 1 to 30 pounds of active compound per acre treated depending on method of application and soil type. Said compositions can also be used in seed treatments.

DETAILED DESCRIPTION OF THE INVENTION

The following detailed but non-limiting examples are provided in order to more clearly point out and define specific embodiments of the invention as well as the scope thereof.

EXAMPLE 1

A solution of 36 grams of 1,1,5-trihydroperfluoroamyltrifluoromethanesulfonate in benzene was added to a solution of 6 grams of potassium hydroxide and 16 grams of o-chlorobenzylmercaptan in ethanol. The resulting solution was refluxed for two hours. The solution was then evaporated in vacuo and 200 ml. of water were added; the resulting mixture was extracted with 2×100 ml. of ether. The combined ether extracts were dried and evaporated in vacuo and the residue subjected to vacuum distillation. o-Chlorobenzyl 1,1,5-trihydroperfluoroamyl sulfide was collected, B.P. 78–82° C./0.12 mm.

*Analysis.*—Calculated for $C_{12}H_9ClF_8S$ (percent): C, 38.7; H, 2.4. Found (percent): C, 38.9; H, 2.3.

The following are examples of compounds prepared by the method described above from the appropriate starting materials. Each compound was tested and found to exhibit fungicidal activity:

m-Chlorobenzyl 1,1,5 - trihydroperfluoroamyl sulfide, B.P. 76–78°/0.02 mm.

*Analysis.*—Calcd. for $C_{12}H_9ClF_8S$ (percent): C, 38.7; H, 2.4. Found (percent): C, 38.9; H, 2.4.

p-Chlorobenzyl 1,1,7-trihydroperfluoroheptyl sulfide, B.P. 96–98°/0.02 mm.

*Analysis.*—Calcd. for $C_{14}H_9ClF_{12}S$ (percent): C, 35.6; H, 1.9. Found (percent): C, 35.6; H, 1.8.

p-Chlorobenzyl 1,1,3-trihydroperfluoropropyl sulfide, B.P. 77–79°/0.25 mm.

*Analysis.*—Calcd. for $C_{10}H_9ClFS$ (percent): C, 44.0; H, 3.3. Found (percent): C, 44.6; H, 3.3.

3-phenylpropyl 1,1,5 - trihydroperfluoroamyl sulfide, B.P. 85–87°/0.05 mm.

*Analysis.*—Calcd. for $C_{14}H_{14}F_8S$ (percent): C, 45.9; H, 3.8. Found (percent): C, 46.1; H, 4.0.

α-Phenethyl 1,1,5-trihydroperfluoroamyl sulfide, B.P. 64–66°/0.06 mm.

*Analysis.*—Calcd. for $C_{13}H_{12}F_8S$ (percent): C, 44.3; H, 3.4. Found (percent): C, 44.4; H, 3.6.

p-Chlorobenzyl 1,1-dihydroperfluorobutyl sulfide, B.P. 61–62°/0.2 mm.

*Analysis.*—Calcd. for $C_{11}H_8ClF_7S$ (percent): C, 38.8; H, 2.5. Found (percent): C, 38.8; H, 2.3.

α-Naphthylmethyl 1,1,5-trihydroperfluoroamyl sulfide, B.P. 111–114°/0.02 mm.

*Analysis.*—Calcd. for $C_{16}H_{12}F_8S$ (percent): C, 49.5; H, 3.1. Found (percent): C, 49.4; H, 3.0.

p-Xylylyl 1,1,5-trihydroperfluoroamyl sulfide, B.P. 74–77°/0.03 mm.

*Analysis.*—Calcd. for $C_{13}H_{12}F_8S$ (percent): C, 44.3; H, 3.4. Found (percent): C, 44.6; H, 3.4.

p-Chlorobenzyl 2,2,2-trifluoroethyl sulfide, B.P. 52.5–54° C./0.06 mm.

*Analysis.*—Calcd. for $C_9H_8ClF_3S$ (percent): C, 44.9; H, 3.3. Found (percent): C, 45.0; H, 3.3.

p-Chlorobenzyl 1,1-dihydroperfluorobutyl sulfide, B.P. 61–62° C./0.2 mm.

*Analysis.*—Calcd. for $C_{11}H_8ClF_7S$ (percent): C, 38.8; H, 2.5. Found (percent): C, 38.8; H, 2.3.

EXAMPLE 2

A solution of 20 g. of 3,4-dichlorobenzyl chloride in benzene was added to a solution of 11 g. of triethylamine and 25 g. of 1,1,5-trihydroperfluoropentyl mercaptan in benzene. The resulting mixture was refluxed for three hours. The reaction mixture was washed well with water. The resulting benzene solution was dried and evaporated in vacuo. The residue was subjected to vacuum distillation. 3,4-dichlorobenzyl 1,1,5-trihydroperfluoroamyl sulfide was collected from 97–99°/0.12 mm.

*Analysis.*—Calcd. for $C_{12}H_8Cl_2F_8S$ (percent): C, 35.4; H, 2.0. Found (percent): C, 35.4; H, 1.9.

EXAMPLE 3

The following list of compounds is provided to illustrate the scope of the invention.

p-Xylylyl 1,1,5-trihydroperfluoroamyl sulfide
p-Methoxybenzyl 1,1,5-trihydroperfluoroamyl sulfide
p-Chlorobenzyl 1,1-dihydroperfluorobutyl sulfide
Benzyl 1,1,3-trihydroperfluoropropyl sulfide
o-Chlorobenzyl 1,1,5-trihydroperfluoroamyl sulfide
m-Chlorobenzyl 1,1,5-trihydroperfluoroamyl sulfide
p-Chlorobenzyl 1,1,5-trihydroperfluoroamyl sulfide
p-Chlorobenzyl 2,2,2-trifluoroethyl sulfide
α-Phenethyl 1,1,5-trihydroperfluoroamyl sulfide
β-Phenethyl 1,1,5-trihydroperfluoroamyl sulfide
3-phenylpropyl 1,1,5-trihydroperfluoroamyl sulfide
2,6-dichlorobenzyl 1,1,5-trihydroperfluoroamyl sulfide
p-Chlorobenzyl 1,1-dihydroperfluoroamyl sulfide
3,4-dichlorobenzyl 1,1,5-trihydroperfluoroamyl sulfide
3,4-dichlorobenzyl 1,1-dihydroperfluoroamyl sulfide
3,4-dichlorobenzyl 1,1-dihydroperfluorobutyl sulfide
m-Chlorobenzyl 1,1,7-trihydroperfluoroheptyl sulfide
p-Nitrobenzyl 1,1,5-trihydroperfluoroamyl sulfide
α-Naphthylmethyl 1,1,5-trihydroperfluoroamyl sulfide
α-(4-bromonaphthyl)methyl 1,1,5-trihydroperfluoroamyl sulfide
2,4-dichlorobenzyl 1,1,5-trihydroperfluoroamyl sulfide
p-Fluorobenzyl 1,1,5-trihydroperfluoroamyl sulfide
p-Bromobenzyl 1,1,5-trihydroperfluoroamyl sulfide
5-bromo-2,4-dimethylbenzyl 1,1,5-trihydroperfluoroamyl sulfide
2,4,6-trimethylbenzyl 1,1-dehydroperfluorobutyl sulfide
Pentamethylbenzyl 1,1,5-trihydroperfluoroamyl sulfide
p-Chlorobenzyl 1,1-dihydroperfluoroheptyl sulfide
2-phenylbutyl 1,1-dihydroperfluorobutyl sulfide
5-phenylhexyl 1,1,5-trihydroperfluoroamyl sulfide

EXAMPLE 4

Description of test for determining fungicidal activity

Each compound to be tested was diulted and added to sterile soil in a sealed soil blender and mived therein for a specified period of time. A standardized quantity of the *Sclerotium rolfsii* fungus was added on a dry weight basis to the chemically treated soil and mixed thoroughly therein. The resulting blend of Sclerotium-inoculated and chemically-treated soil was portioned into suitable containers; two carrot slices were implanted therein. The containers were water sealed to prevent loss of potential chemical vapor phase and placed in the greenhouse for subsequent observation.

Disease severity was determined by actual counts of infection loci on carrot slices in Sclerotium-inoculated soil and compared to equivalent counts on carrot slices in sterile soil. Infection loci were counted 5 days after inocunlation and compared with controls in soil containing *Sclerotia* but no added chemicals. At a concentration of 50 parts per million each of the compounds tested completely inhibited infection. Each compound was similarily applied to cotton, tomatotes, beans, cucumbers, sweet potatoes and peanuts at a rate of 100 pounds per acre, such rate being in considerable excess over that required to achieve control of the fungal pathogen. In no case wre phytotoxic symptoms noted.

The following compounds were found to have a particularly high degree of activity in the above described test:

p-chlorobenzyl 1,1,5-trihydroperfluoroamyl sulfide
m-crlorobenzyl 1,1,5-trihydroperfluoroamyl sulfide
o-chlorobenzyl 1,1,5-trihydroperfluoroamyl sulfide
2,4-dichlorobenzyl 1,1,5-trihydroperfluoroamyl sulfide
3,4-dichlorobenzyl 1,1,5-trihydroperfluoroamyl sulfide
2,6-dichlorobenzyl 1,1,5-trihydroperfluoroamyl sulfide
p-bromobenzyl 1,1,5-trihydroperfluoroamyl sulfide
p-fluorobenzyl 1,1,5-trihydroperfluoroamyl sulfide
β-phenethyl 1,1,5-trihydroperfluoroamyl sulfide
Benzyl 1,1,5-trihydroperfluoroamyl sulfide
p-chlorobenzyl 1,1-dihydroperfluorobutyl sulfide
2-(p-chlorophenyl)ethyl 1,1,5-trihydroperfluoroamyl sulfide While all of the compounds falling within the scope of the invention exhibit fungicidal activity, it is to be understood that some are more highly effective than others. The above-listed compounds are examples of preferred embodiments which exhibit high fungicidal activity and minimal phytotoxicity.

What is claimed is:

1. Compounds of the formula:

wherein Ar— is

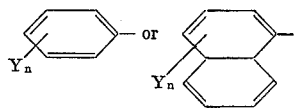

—alk— is an alkylene radical having from 1 to 6 carbon atoms, $m$ is an integer from 1 to 8, X is hydrogen or fluorine, Y is hydrogen, lower alkyl, lower alkoxy, halo or nitro and $n$ is an integer from 1 to 5.

2. A compound according to claim 1 in which

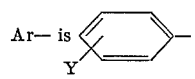

$m$ is 2 to 5, —alk— is methylene and Y is hydrogen or halogen.

3. A compound according to claim 1 in which Ar— is

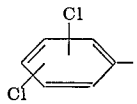

—alk— is methylene and $m$ is 2 to 5.

4. A compound according to claim 1, in which Ar is

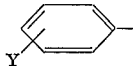

—alk— is ethylene, and $m$ is 2 to 5.

5. A compound according to claim 1, in which Ar—alk— is benzyl or chlorobenzyl, X is H and $m$ is 4.

6. p-chlorobenzyl 1,1,5-trihydroperfluoroamyl sulfide according to claim 1.

7. m-chlorobenzyl 1,1,5-trihydroperfluoroamyl sulfide according to claim 1.

8. Benzyl 1,1,5-trihydroperfluoroamyl sulfide according to claim 1.

No references cited.

CHARLES B. PARKER, Primary Examiner

D. R. PHILLIPS, Assistant Examiner

U.S. Cl. X.R.

424—337